US007636851B2

(12) United States Patent
Hamblin et al.

(10) Patent No.: US 7,636,851 B2
(45) Date of Patent: Dec. 22, 2009

(54) PROVIDING USER ON COMPUTER OPERATING SYSTEM WITH FULL PRIVILEGES TOKEN AND LIMITED PRIVILEGES TOKEN

(75) Inventors: Jeffrey B. Hamblin, Issaquah, WA (US); Jonathan Schwartz, Kirkland, WA (US); Kedarnath A. Dubhashi, Redmond, WA (US); Klaus U. Schutz, Kirkland, WA (US); Peter T. Brundrett, Seattle, WA (US); Richard B. Ward, Redmond, WA (US); Thomas C. Jones, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 11/171,744

(22) Filed: Jun. 30, 2005

(65) Prior Publication Data

US 2007/0005961 A1 Jan. 4, 2007

(51) Int. Cl.
*G06F 21/00* (2006.01)
(52) U.S. Cl. .................. 713/182; 713/172; 713/185; 709/225; 709/229; 726/2; 726/4; 726/9; 726/10
(58) Field of Classification Search ................ 713/172, 713/182, 185; 726/2, 4, 9, 10; 709/225, 709/229
See application file for complete search history.

(56) References Cited

U.S. PATENT DOCUMENTS

| 6,279,111 | B1 * | 8/2001 | Jensenworth et al. | 726/10 |
|---|---|---|---|---|
| 6,308,273 | B1 * | 10/2001 | Goertzel et al. | 726/9 |
| 6,308,274 | B1 * | 10/2001 | Swift | 726/9 |
| 6,775,781 | B1 * | 8/2004 | Phillips et al. | 726/4 |
| 6,922,784 | B2 * | 7/2005 | Phillips et al. | 726/18 |
| 7,290,279 | B2 * | 10/2007 | Eun et al. | 726/9 |
| 7,376,838 | B2 * | 5/2008 | Narayanan | 713/183 |
| 7,383,437 | B1 * | 6/2008 | Dik | 713/164 |
| 7,454,786 | B2 * | 11/2008 | Chang et al. | 726/14 |
| 7,472,191 | B2 * | 12/2008 | Stewart et al. | 709/225 |
| 7,562,226 | B2 * | 7/2009 | Aiken et al. | 713/182 |
| 7,581,246 | B2 * | 8/2009 | Zahari | 726/9 |

(Continued)

OTHER PUBLICATIONS

"After you turn on User Account Control in Windows Vista, programs may be unable to access some network locations." Jun. 24, 2009. http://support.microsoft.com/kb/937624.*

(Continued)

*Primary Examiner*—Christopher A Revak
*Assistant Examiner*—Sarah Su
(74) *Attorney, Agent, or Firm*—Woodcock Washburn LLP

(57) ABSTRACT

An operating system for a computing device has a first session for a user that includes a first base process that has a first privileges token attached thereto. The first privileges token includes substantially a full set of privileges of the user on the operating system. The operating system also has a second session for the user that includes a second base process that has a second privileges token attached thereto. The second privileges token is derived from the first privileges token and includes only a minimum set of privileges of the user on the operating system. Thus, the second, limited token does not have all privileges associated with the first, full token but instead has a limited set of privileges and not extra privileges that could be employed to take actions that would be harmful, deceptive, or malicious.

20 Claims, 4 Drawing Sheets

U.S. PATENT DOCUMENTS

2002/0099952 A1* 7/2002 Lambert et al. ............. 713/200
2003/0191846 A1* 10/2003 Hunnicutt et al. ........... 709/229
2003/0233544 A1* 12/2003 Erlingsson ................. 713/167
2005/0149726 A1* 7/2005 Joshi et al. ................. 713/164
2007/0107048 A1* 5/2007 Halls et al. .................... 726/4
2007/0199057 A1* 8/2007 Plummer ...................... 726/9

OTHER PUBLICATIONS

"SudoHowTo." Waikato Linux Users Group. Feb. 22, 2007. http://www.wlug.org.nz/SudoHowto.*

"SuperUser." Waikato Linux Users Group. Sep. 15, 2006. http://www.wlug.org.nz/SuperUser.*

* cited by examiner

PROVIDING USER ON COMPUTER OPERATING SYSTEM WITH FULL PRIVILEGES TOKEN AND LIMITED PRIVILEGES TOKEN

TECHNICAL FIELD

The present invention relates to an operating system for a computing device and to logging a user on to the operating system of the computing device. More particularly, the present invention relates to providing the user as logged on to the operating system with a full privileges token that when attached to a process provides the process with full operating system privileges, and also with a limited privileges token that when attached to a process provides the process with limited operating system privileges.

BACKGROUND OF THE INVENTION

In a typical computing device such as a personal computer or the like, the computing device is operated based on an operating system or the like that is instantiated on the computing device. As may be appreciated, such an operating system among other things may maintain a user account for each of one or more users that may employ the computing device, where each user account among other things may specify rights and privileges (hereinafter, 'privileges') that the corresponding user has with respect to the computing device. For example, the user account for a particular user may specify whether the user can instantiate applications on the computing device, whether the user can install applications on the computing device, whether the user can alter the operating system of the computing device, whether the user can access files of other users on the computing device, and the like.

Significantly, when a user logs on to such an operating system, the operating system may create a token describing the privileges of the user based on the user account thereof, where such token is then attached to a base process or the like. As may be appreciated, such a base process is likely a shell or other base platform from which other processes may be instantiated. As may also be appreciated, such a token is a software construct or the like and rests in a memory of the computing device. Thus, such attachment of such a token is likely conceptual in nature, and may for example comprise providing the base process with a pointer or other reference to the created token.

At any rate, with the attached token, the operating system allows the base process to operate only in accordance with the privileges of the user as set forth within the attached token. For example, if the base process wishes to read data from a particular location or change system time, the operating system in fact allows the base process to read the data or to change the system time only if the attached token so allows based on the privileges set forth therein. Generally, employing an attached token to specify privileges for a process running on an operating system of a computing device is known or should be apparent to the relevant public and therefore need not be set forth herein in any detail.

Note that when a first process on an operating system creates a second process on the operating system, the operating system typically copies the token of the first process and attaches such copied token to the second process. Thus, without more, the second process has the same privileges on the operating system as the first process inasmuch as the copied token of the second process specifies the same privileges as the token of the first process. However, it may be the case that the first process in the course of creating the second process wishes to restrict the privileges of the second process. If so, and as is known, the operating system copies the token of the first process for the second process and then removes certain privileges therefrom prior to attaching such copied token to the second process. Here, then, the second process has less privileges on the operating system as compared with the first process. Typically, a first process can assign to a second process only as many privileges as such first process may possess, and no more. Thus, the privileges of the second process as specified in the token thereof are a sub-set of the privileges of the first process as specified in the token thereof.

Based on the above, then, it is to be appreciated that a user of an operating system on a computing device may be logged on thereto according to a user account that has full privileges. Consequently, any application program that such a full-privilege user may instantiate on the computing device is, without more, accorded full privileges. However, and significantly, an application instantiated with full privileges presents a security risk to the operating system inasmuch as such a full-privilege application is not restricted from performing harmful, deceptive, or malicious actions. Thus, a full-privilege user may directly or indirectly instantiate an application with full privileges, and such application intentionally or unintentionally may exploit the full privileges provided thereto, for example, to modify files on the computing device, to modify the operating system, or even to take control of critical operating system behavior.

Accordingly, a need exists for a method and mechanism by which the process of an application or the like is provided with a token that contains only a limited set of privileges, whereby such a limited privilege token only allows the process to perform a limited set of actions which presumably are not harmful, deceptive, or malicious. In particular, a need exists for such a method and mechanism whereby a user upon logging on to a computing device is provided with both a limited privilege token with a limited set of privileges and a full privilege token with a full set of privileges, whereby processes that are not deemed to be especially trustworthy may be instantiated on the computing device based on the limited privilege token of the user, and processes that are deemed to be especially trustworthy may be instantiated on the computing device based on the full privilege token of the user.

SUMMARY OF THE INVENTION

The aforementioned needs are satisfied at least in part by the present invention in which a computing device operates based on an operating system instantiated thereon, where the operating system has a user logged on thereto. In the operating system, a first session for the user includes a first base process that has a first privileges token attached thereto. The first privileges token sets forth privileges of the user that may be applied to the first base process such that the first base process operates only in accordance with the privileges of the user as set forth in the attached first privileges token. The first privileges token of the first base process of the first session includes substantially a full set of privileges of the user on the operating system of the computing device.

Also in the operating system, a second session for the user includes a second base process that has a second privileges token attached thereto. The second privileges token sets forth privileges of the user that may be applied to the second base process such that the second base process operates only in accordance with the privileges of the user as set forth in the attached second privileges token. The second privileges token of the second base process of the second session is derived from the first privileges token of the first base process of the first session and includes only a minimum set of privileges of the user on the operating system of the computing device. Thus, the first privileges token is a full privileges token and the second privileges token is a limited privileges token. In particular, the limited token does not have all privileges associated with the full token but instead has a limited set of privileges and not extra privileges that could be employed to take actions that would be harmful, deceptive, or malicious.

To log the user on to the operating system, such user is authenticated based on information obtained therefrom and a user account corresponding thereto as maintained by the operating system, and a first session is created for the user. Security information is collected based at least partially on the user account for the user to create a full privileges token that represents a full security context available for the user on the operating system in connection with the first session, and the full token is generated based on the security information to encapsulate and specify privileges represented by such security information such that the full token includes substantially a full set of privileges of the user on the operating system of the computing device. A first base process is created for the first session and the full token is attached to such first base process such that the first base process operates only in accordance with the privileges of the user as set forth in the attached full token.

The full token is reviewed to determine that such full token includes privileges beyond a predetermined minimum set of limited privileges, and a second session is created for the user. Another full token is generated to include substantially a full set of privileges of the user on the operating system of the computing device, and the another full token is modified by removing all privileges except the minimum set of limited privileges to convert such another full token into a limited privileges token that represents a limited security context available for the user on the operating system in connection with the second session. The limited token thus includes a limited set of privileges of the user on the operating system of the computing device as compared with the full set of privileges of the full token. Finally, a second base process is created for the second session and the limited token is attached to such second base process such that the second base process operates only in accordance with the privileges of the user as set forth in the attached limited token.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Enviroment

Figure 1:
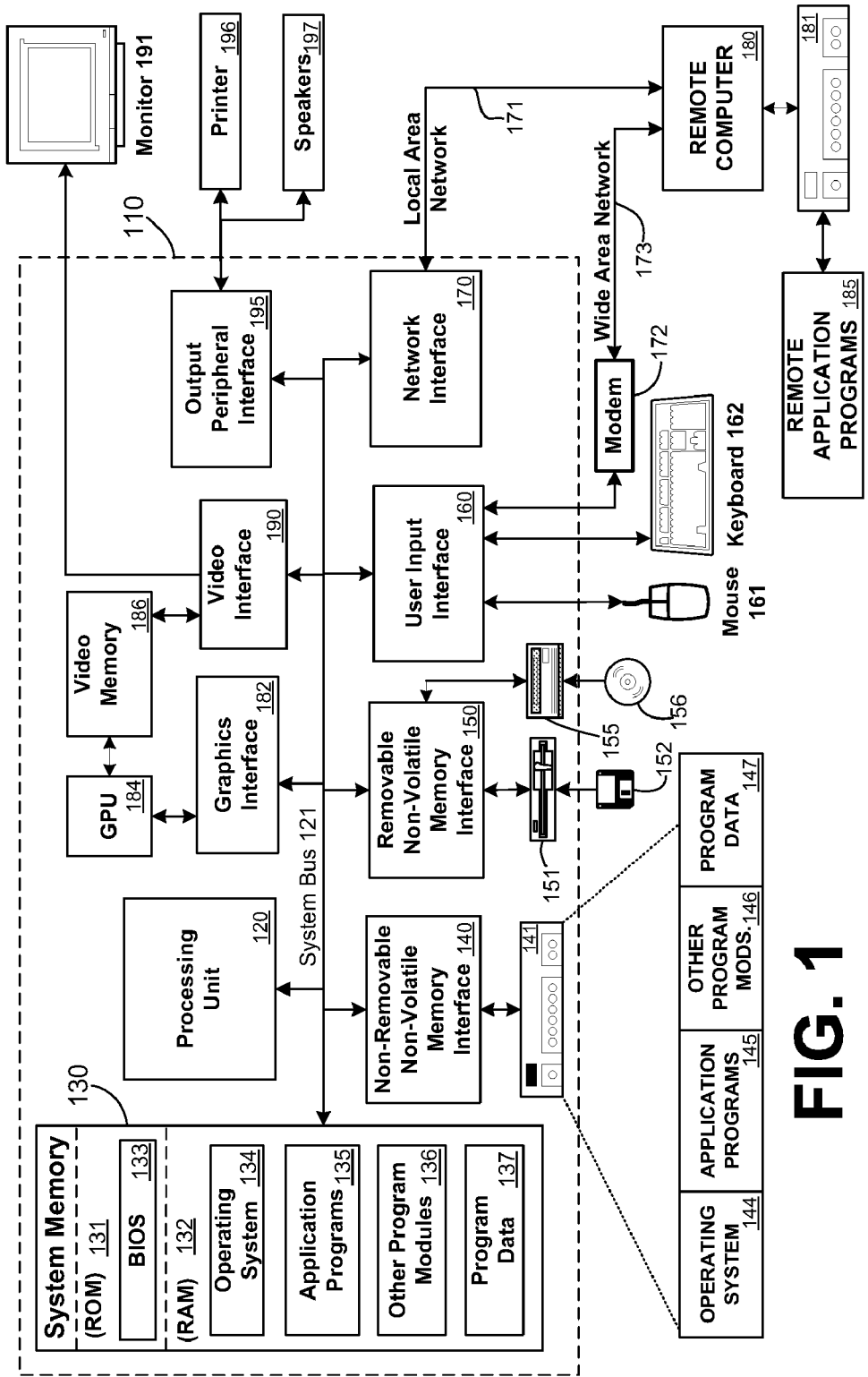
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
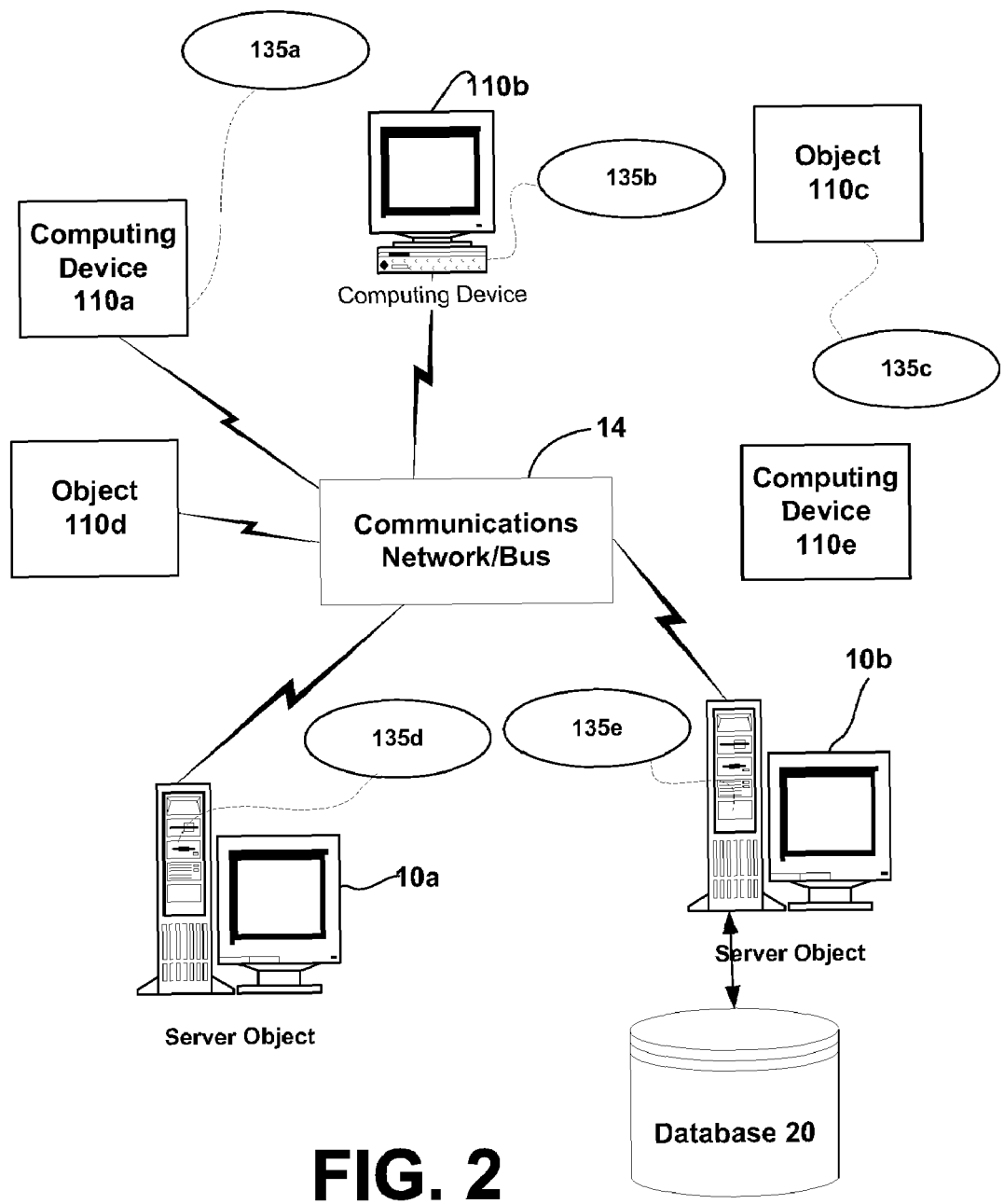
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wire-line or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11 b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 110e and databases 20.

Full Privileges Token and Limited Privileges Token

Figure 3:
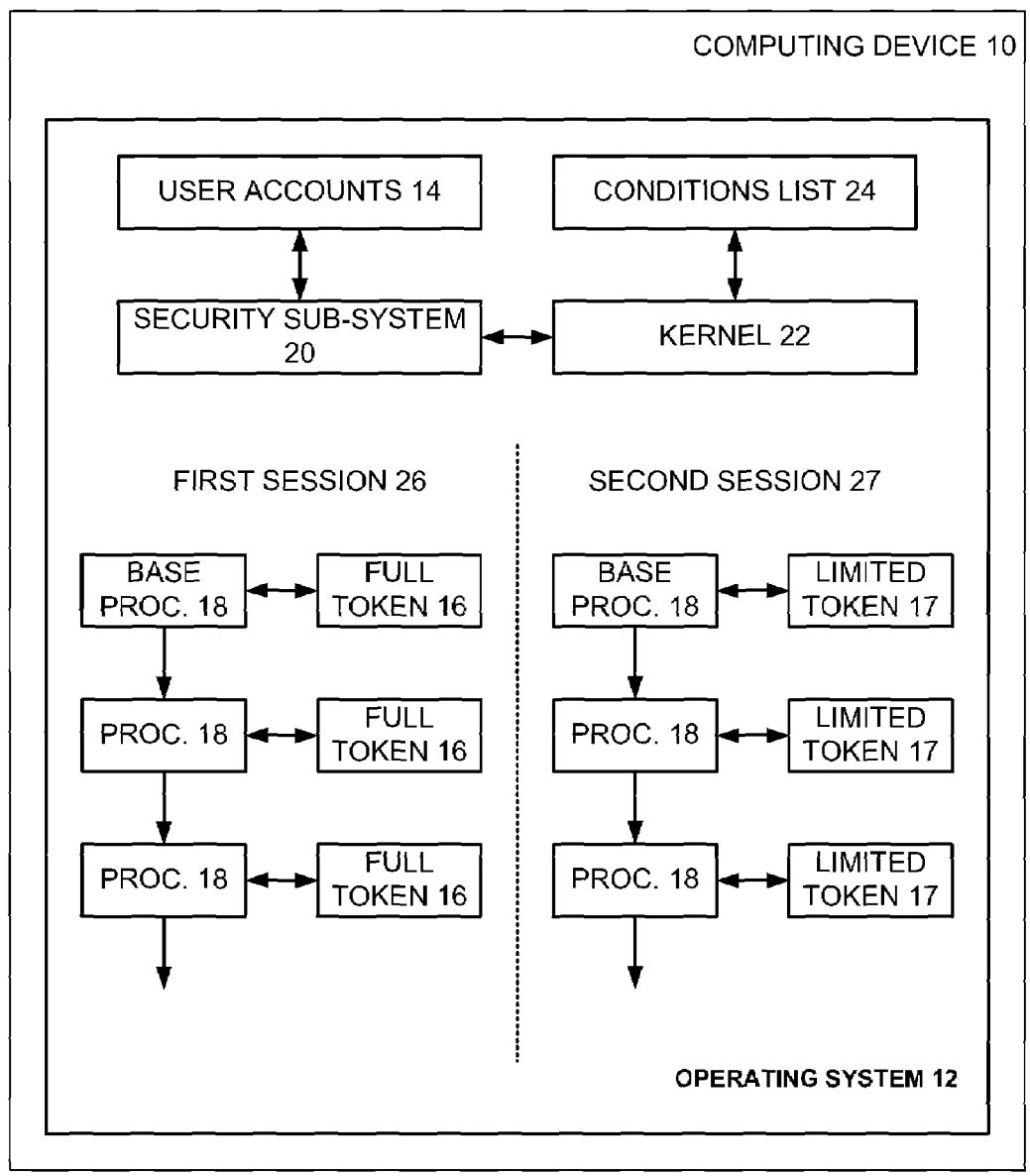
FIG. 3 is a block diagram showing an architecture of a computing device with an operating system such as that which may be employed in connection with embodiments of the present invention.

Turning now to FIG. 3, it is seen that a computing device 10 is operated based on an operating system or the like 12 that is instantiated on the computing device 10. Such computing device 10, operating system 12, and instantiation may be any appropriate computing device 10, operating system 12, and instantiation without departing from the spirit and scope of the present invention.

As shown, the operating system 12 among other things maintains a user account 14 for each of one or more users that may employ the computing device 10, and each user account 14 among other things specifies privileges that the corresponding user has with respect to the computing device 10. Such user accounts 14 and privileges specified therein may be any appropriate user accounts 14 and privileges without departing from the spirit and scope of the present invention. For example, and as was set forth above, the user account for a particular user may specify whether the user can instantiate applications on the computing device, whether the user can install applications on the computing device, whether the user can alter the operating system of the computing device, whether the user can access files of other users on the computing device, and the like.

When a user logs on to such an operating system 12, the operating system 12 may create a token 16 describing privileges of the user based on the user account 14 thereof. As was set forth above, the operating system 12 may operate multiple processes 18 on the computing device 10, where each process 18 has an attached token 16, and where the operating system 12 allows each process 18 to operate only in accordance with the privileges of the user as set forth within the attached token 16.

Generally, when a user first logs on to the operating system 12, the operating system 12 creates a base process 18 with the created token 16 attached thereto, by way of security subsystem 20 of the operating system 12. The base process 18 may then generate additional processes 18, each with an attached token 16, such additional processes 18 may then in turn generate additional processes 18, each with an attached token 16, and so on. Significantly, each 'child' process 18 as generated by a 'parent' process 18 inherits the token 16 of the parent process 18, although the inherited token 16 may only contain a subset of the privileges of the parent process 18. In particular, the inherited token 16 is a copy of the token 16 of the parent process 18, perhaps with certain privileges removed.

It is to be appreciated, then, that if a user is logged on according to a user account 14 that has full privileges, any process 18 instantiated based on such user can have attached thereto a token 16 with full privileges. However, such a process 18 with full privileges is a security risk to the operating system 12 in that such a process 18 can perform harmful, deceptive, or malicious actions with regard to the operating system 12.

In one embodiment of the present invention, then, when a user logs on to such an operating system 12, the operating system 12 creates a pair of tokens (16, 17), each describing privileges of the user based on the user account 14 thereof. In particular, in one embodiment of the present invention, the user as logged on to the computing device 10 is provided with a first session 26 with an associated full privileges token 16 representing a full set of privileges available to the user, and a second session 27 with an associated limited privileges token 17 representing a limited set of privileges available to the user. Accordingly, the limited privileges token 17 does not have the full spectrum of administrative privileges associated with the full privileges token 16. That is, the limited privileges token 17 includes only a limited set of privileges that most processes 18 operating on the computing device 10 should require, but not extra privileges that most processes 18 should not require and that might be used in an attempt by a rogue process 18 to take actions that would be harmful, deceptive, or malicious.

The differences between the privileges set forth in a limited privileges token 17 (hereinafter a 'limited token 17') and in a full privileges token 16 (hereinafter a 'full token 16') may be any differences without departing from the spirit and scope of the present invention, presuming such differences are designed to deter the aforementioned harmful, deceptive, or malicious actions of a rogue process 18. Such differences are known or should be apparent to the relevant public and therefore need not be set forth herein in any detail. At a minimum, though, a process 18 with an attached limited token 17 should not be allowed to modify the configuration or system behavior of the operating system 12 on the computing device 10.

Most any application, program, executable, or the like (hereinafter, 'application') run by a user likely should be instantiated as a process 18 from the second session 27 that is assigned the limited token 17 and therefore represents a lower risk to the operating system 12 and computing device 14. In contrast, the full token 16 with all administrative privileges likely should only be available to a process 18 from the first session 26 instantiating an application designed to carry out administrative tasks on the operating system 12 after the user provides consent to do so. Alternatively, the limited token 17 should be assigned when an application is not especially trustworthy while the full token 16 should be assigned when an application is indeed especially trustworthy.

In one embodiment of the present invention, the second session 27 as defined by the limited token 17 is primarily employed to create processes for a user. Thus, all processes 18 of the second session 27 have attached thereto a copy of the limited token 17, perhaps with certain privileges removed.

Of course, it may in fact be the case that from time to time a process 18 legitimately requires privileges that are available from the full token 16 for the user and not from the limited token 17 for such user. In such an instance, the 'limited' parent process 18 for such a 'full' child process 18 in effect generates same, but does not have the limited token 17 attached to such full child process 18 upon such generation. Instead, and in one embodiment of the present invention, the limited parent process 18 accesses the security sub-system 20 of the operating system 12 with a request to generate the full child process 18 and a copy of the limited token 17. As may be appreciated, then, the security sub-system 20 determines whether the full child process 18 can indeed be generated. If so, the security sub-system 20 reviews the limited token 17 to locate therein a reference to the corresponding full token 16 for the user, locates such full token 16 based thereon, and then appropriately generates such full child process 18 with a copy of the full token 16 attached thereto.

To summarize thus far, then, with the present invention, a user logged on to an operating system 12 is provided with a limited token 17 associated with a first session 26 and specifying a limited set of privileges, and a full token 16 associated with a second session 27 and specifying a full set of privileges. The limited token 17 as implemented is a filtered version of the full token 16, with privileges of the full token 16 that are deemed sensitive in terms of security removed. The full token 16 is protected by the security sub-system 20 of the operating system 12 so that such security sub-system 20 controls which processes 18 have attached thereto a copy of the full token 16. Thus, a limited parent process 18 can not itself generate a full child process 18, and cannot elevate itself to full status.

Essentially, the security sub-system 20 generates both the full token 16 and the limited token 17 for the user as logged on, and each token (16, 17) as generated is associated with a separate session (26, 27). The limited token 17 is associated with the full token 16, and thus the tokens (16, 17) are linked to allow a limited process 18 to initiate generation of a full process 18, such as for example when the operating system 12 decides to do so based on a request from a caller or the like. As maybe appreciated, such a caller may be a user attempting to exercise additional privileges, an application requiring use of additional privileges, and the like. As may also be appreciated, a user or application in the context of a full process 18 may also call to initiate generation of a limited process 18 to, for example, limit any threats or perceived risks. The default session (26, 27) for the user is the limited session 27 associated with the limited token 17. Thus, new processes are generated to be attached to a copy of the limited token 17 by default.

Figure 4:
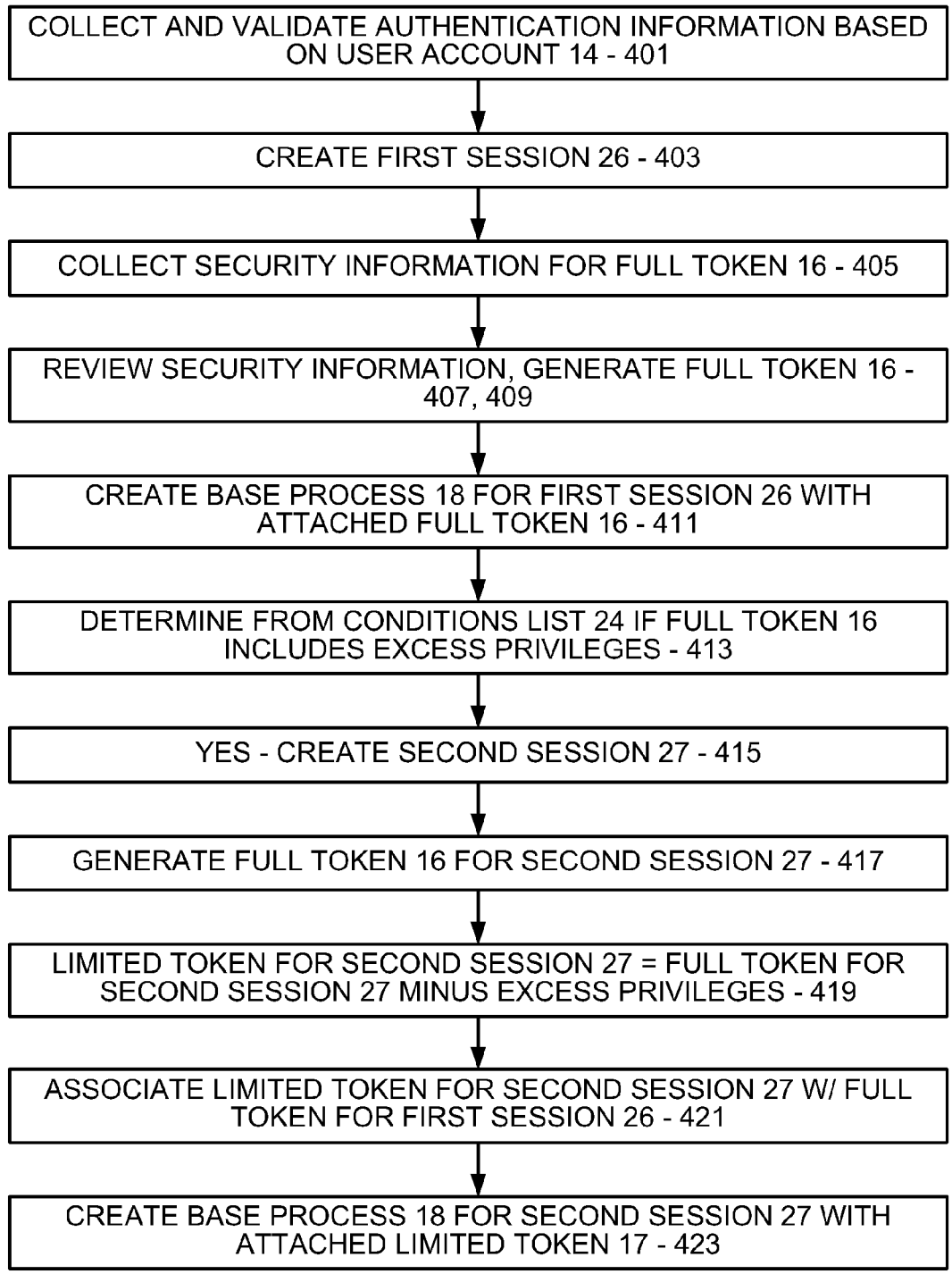
FIG. 4 is a flow diagram showing key steps performed in connection with the computing device and operating system of FIG. 3 in the course of logging on a user in accordance with one embodiment of the present invention, where a limited token and a full token are generated for the user.

In one embodiment of the present invention, and turning now to FIG. 4, a process employed to log on a user to a computing device 10 with the operating system 12 is shown. Preliminarily, the user is prompted to provide appropriate authentication information, such as for example a user name and a password, and the security sub-system 20 of the operating system 12 of the computing device 10 collects and validates same based on a user account 14 corresponding to the authentication information for the user (step 401).

Presuming such validation succeeds, the security sub-system 20 then creates a first session 26 by requesting same from a core part of the operating system 12 that is secure, such as a kernel 22 or the like (step 403). In addition, the security sub-system 20 collects all security information necessary to create a full token 16 that represents the broadest security context available for the user on the operating system 12 in connection with the first session 26 (step 405). Such security information may be any appropriate security information without departing from the spirit and scope of the present invention. For example, such security information may include identifications of the user and groups to which the user belongs, identifications of security types to be associated with the user, identifications of privileges to be applied to the user, and the like.

The security sub-system 20 then submits such collected security information to the kernel 22 or the like, and the kernel 22 reviews such submitted security information and in fact generates a full token 16 based thereon to encapsulate and specify the privileges represented by the submitted security information (step 407). Such generation of such full token 16 by the kernel 22 or the like is known or should be apparent to the relevant public and therefore need not be set forth herein in any detail. Accordingly, and particular method of generating the full token 16 may be employed without departing from the spirit and scope of the present invention. Typically, the generated full token 16 is maintained in a memory reserved for the kernel 22, and the kernel 22 returns to the security sub-system 18 a reference to such full token 16 as residing in the memory (step 409).

Thereafter, the full token 16 may be used as appropriate to finalize logging the user on to the first session 26 on the operating system 12. In particular, the security sub-system 20 may by appropriate request to the kernel 22 create a base process 18 for the first session 26 and attach the full token 16 to such base process 18 (step 411). Note that in doing so, the base process 18 is in effect the property of the newly logged on user as represented by such full token 16.

In one embodiment of the present invention, in addition to the previous steps, the process of logging the user on to operating system continues with the security sub-system 20 requesting that the kernel 22 review the full token 16 to determine if such full token 16 includes privileges above and beyond a predetermined minimum set of limited privileges, and such kernel 22 in fact performs such review and returns the result of such a review to the security sub-system 20 (step 413). Such review may be performed in any appropriate manner and based on any appropriate criteria without departing from the spirit and scope of the present invention. For example, the kernel 22 may be provided with a list 24 of conditions defining the minimum set of limited privileges, may review the full token 16 against the conditions list 24, and may return a positive result if in fact the full token 16 includes privileges above and beyond the predetermined minimum set of limited privileges as embodied by the conditions list 24. Such conditions list 24 may for example include: whether the user is a high-level user, whether the user has certain privileges, whether the user is in a particular group, whether the user is a member of a high-level domain, and the like.

If the result as returned by the kernel 22 is negative such that the full token 16 does not include privileges above and beyond the predetermined minimum set of limited privileges as embodied by the conditions list 24, and as may be appreciated, such security sub-system 20 need not in fact generate a limited token 16 for the user, especially inasmuch as the full token 16 for such user is in effect not a danger to the operating system 12. However, and as should also be appreciated, if the result as returned by the kernel 22 is positive such that the full token 16 does indeed include privileges above and beyond the predetermined minimum set of limited privileges as embodied by the conditions list 24, the security sub-system 20 should continue and generate a limited token 16 for the user to protect against such danger.

Accordingly, in response to a positive result, the security sub-system 20 continues by creating a second session 27 by requesting same from the kernel 22 (step 415). In addition, the security sub-system 20 again requests that the kernel 22 generate a full token 16, although this time for the second session 27 (step 417). Note that such full token 16 for the second session 27 may be generated substantially as before, with the security sub-system 20 collecting all security information necessary as at step 405, submitting same to the kernel 22 as at step 407, and receiving a reference to such full token 16 from the kernel 22 as at step 409. Alternatively, if available, the security sub-system 20 may merely request that the kernel 22 duplicate the full token 16 of the first session 26 as the full token 16 of the second session 27 and return a reference to such full token 16 of the second session 27.

In either case, with the reference to the full token 16 for the second session 27, the security sub-system 20 requests that the kernel 22 modify the full token 16 for the second session 27 by removing all privileges except the minimum set of limited privileges as set forth in the conditions list 24. In response, the kernel 22 in fact modifies the full token 16 for the second session 27 by removing all privileges except the minimum set of limited privileges as set forth in the conditions list 24, thus converting such full token 16 for the second session 27 into the limited token 17 for the second session 27 (step 419). In effect, then, the kernel 22 filters the full token 16 according to the conditions list 24 to produce the limited token 17. Although the kernel 22 could at this point return a reference to such limited token 17 for the second session 27, such a reference should be the same as the previously returned reference for the full token 16 for the second session 27, and therefore is not believed to be absolutely necessary unless for some reason the reference is in fact different.

Once the limited token 17 for the second session 27 is generated, and as was alluded to above, such limited token 17 should be associated with the corresponding full token 16 for the first session 26 so that such association can be employed in the event a limited process 18 in the second session 27 is to initiate generation of a full process 18 in the first session 26. To do so, and as may now be appreciated, the security sub-system 20 requests that the kernel 22 in fact create such association. In response, the kernel 22 in fact so associates the limited token 17 for the second session 27 with the full token 16 for the first session 26 (step 421).

Thereafter, and as before, the limited token 17 may be used as appropriate to finalize logging the user on to the second session 27 on the operating system 12. In particular, the security sub-system 20 may by appropriate request to the kernel 22 create a base process 18 for the second session 27 and attach the limited token 17 to such base process 18 (step 423). In doing so, and again, the base process 18 in effect becomes the property of the newly logged on user as represented by such limited token 17.

Note that a process 18 as instantiated by the operating system 12 with a full or limited token (16, 17) need not necessarily be a process resident on the computing device 10 of such operating system 12. Instead, such process 18 could be remote, such as for example on a server communicatively coupled to the computing device 10. In such a situation, the privileges present in the limited token 17 would be transferred to the server by way of a security protocol so that the server trusts same.

Note too that although the present invention is set forth herein in terms of a full token 16 for a first session 26 and a limited token 17 for a second session 27, additional tokens (16, 17) for additional sessions (26, 27) may also be employed. For example, it may be the case that the security sub-system 20 obtains additional tokens (16, 17) from the kernel 22 for one or more intermediate sessions (26, 27) each with some intermediate level of privileges.

Note further that although the present invention is set forth herein in terms of a security sub-system 20 communicating with a kernel 22 to obtain a token, other arrangements and constructs may alternately be employed without departing from the spirit and scope of the present invention. For example, it may be the case that the security sub-system 20 and the kernel 22 or at least the relevant portions of such kernel 22 are embodied as a unitary construct. Likewise, it may be the case that the security sub-system 20 itself is in fact multiple services performing different functions as necessary.

Note finally that although the present invention is set forth herein in terms of a token 16 with privileges, such privileges on such token 16 include not only privileges, but rights, groups, and any other grants to a user that are employed to allow such user access to documents, resources, files, workspaces, and the like. Thus, 'privileges' should not be considered limiting but instead should be interpreted as broadly as possible.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a method and mechanism are provided by which a process 18 of an application or the like is provided with a token 16 that contains only a limited set of privileges, whereby such a limited privilege token 16 only allows the process 18 to perform a limited set of actions which presumably are not harmful, deceptive, or malicious. In particular, a user upon logging on to a computing device 10 is provided with both a limited privilege token 16 with a limited set of privileges and a full privilege token 16 with a full set of privileges, whereby processes 18 that are not deemed to be especially trustworthy may be instantiated on the computing device 10 based on the limited privilege token 16 of the user, and processes 18 that are deemed to be especially trustworthy may be instantiated on the computing device 10 based on the full privilege token 16 of the user.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A computing device operating based on an operating system instantiated thereon, the operating system having a user logged on thereto, the operating system having:

first and second privileges tokens created at the time of logon for each user account, each token associated with a separate session;

a first session for the user including a first base process, the first base process of the first session having the first privileges token attached thereto, the first privileges token setting forth privileges of the user that may be applied to the first base process such that the first base process operates only in accordance with the privileges of the user as set forth in the attached first privileges token, the first privileges token of the first base process of the first session including a full set of privileges of the user on the operating system of the computing device; and a second session for the user including a second base process, the second base process of the second session having the second privileges token attached thereto, the second privileges token setting forth privileges of the user that may be applied to the second base process such that the second base process operates only in accordance with the privileges of the user as set forth in the attached second privileges token, the second privileges token of the second base process of the second session including only a minimum set of privileges of the user on the operating system of the computing device, wherein the first privileges token is a full privileges token and the second privileges token is a limited privileges token, the limited token not having all privileges associated with the full token but instead having a limited set of privileges and not extra privileges that could be employed to take actions that would be harmful, deceptive, or malicious.

2. The device of claim 1 wherein the operating system further has a user account for the user, the user account setting forth all privileges of the user on the operating system of the computing device, and wherein the privileges set forth in the first privileges token of the first session are derived from the privileges set forth in the user account.

3. The device of claim 1 wherein each session also includes at least one child process created by the base process of such session, the child process inheriting a copy of the privileges token of the session thereof, the inherited privileges token setting forth privileges of the user that may be applied to the child process such that the child process operates only in accordance with the privileges of the user as set forth in the inherited privileges token, the inherited privileges token of the child process of such session including at least a subset of the privileges of the privileges token of the base process of such session.

4. The device of claim 1 wherein the operating system further has a security sub-system for logging the user on to the operating system, for instantiating each of the first session with the first base process having the full privileges token attached thereto and the second session with the second base process having the limited privileges token attached thereto when logging the user on to the operating system, and for determining the privileges of each of the full privileges token and the limited privileges token.

5. The device of claim 1 wherein the limited privileges token is a filtered version of the full privileges token without privileges of the full privileges token that are deemed a security risk.

6. The computing device of claim 1 wherein the operating system further has a third session for the user including a third base process, the third base process of the third session having a third privileges token attached thereto, the third privileges token setting forth privileges of the user that may be applied to the third base process such that the third base process operates only in accordance with the privileges of the user as set forth in the attached third privileges token, the third privileges token of the third base process of the third session being derived from the first privileges token of the first base process of the first session and including an intermediate set of privileges of the user on the operating system of the computing device, wherein the third privileges token is an intermediate privileges token having fewer privileges than the full privileges token and more privileges than the limited privileges token.

7. A method for logging a user on to an operating system of a computing device, the method comprising:

authenticating the user based on information obtained therefrom and a user account corresponding thereto as maintained by the operating system;

creating a first session for the user;

collecting during user logon, based at least partially on the user account for the user, security information necessary to create a full privileges token that represents a full security context available for the user on the operating system in connection with the first session;

generating, during the user logon, the full token based on the security information to encapsulate and specify privileges represented by such security information such that the full privileges token includes a full set of privileges of the user on the operating system of the computing device;

creating a first base process for the first session and attaching the full privileges token to such first base process such that the first base process operates only in accordance with the privileges of the user as set forth in the attached full privileges token;

reviewing the full privileges token to determine that such full privileges token includes privileges beyond a predetermined minimum set of limited privileges;

creating a second session for the user during said user logon;

generating, during the user logon, another full privileges token to include the full set of privileges of the user on the operating system of the computing device;

modifying the another full privileges token by removing all privileges except the minimum set of limited privileges to convert such another full privileges token into a limited privileges token that represents a limited security context available for the user on the operating system in connection with the second session, the limited privileges token thus including a limited set of privileges of the user on the operating system of the computing device as compared with the full set of privileges of the full privileges token; and associating the full privileges token with the limited privileges token during the user logon process creating a second base process for the second session and attaching the limited privileges token to such second base process such that the second base process operates only in accordance with the privileges of the user as set forth in the attached limited privileges token.

8. The method of claim 7 wherein said step of collecting the security information includes collecting identifications of the user and groups to which the user belongs, identifications of security types to be associated with the user, and identifications of privileges to be applied to the user.

9. The method of claim 7 wherein said step of generating the full privileges token includes submitting the collected security information to a kernel of the operating system, the kernel reviewing such submitted security information and in fact generating the full privileges token based thereon to encapsulate and specify the privileges represented by the submitted security information, the kernel storing the generated full privileges token in a memory reserved for the kernel and returning a reference to such full privileges token as residing in the memory.

10. The method of claim 7 wherein said step of reviewing the full privileges token includes comparing the privileges of the full privileges token with a list of conditions defining the minimum set of limited privileges.

11. The method of claim 10 comprising modifying the another full privileges token by filtering said another full token according to the list of conditions to remove all privileges except the minimum set of limited privileges as set forth in the list of conditions.

12. The method of claim 7 wherein said step of generating the another full privileges token comprises of generating the another full privileges token in a manner akin to generating the full privileges token of the first session; and duplicating the full token of the first session.

13. The method of claim 7 wherein associating the limited privileges token with the full privileges token is employed in the event a process in the second session is to initiate generation of a process in the first session.

14. A computer-readable storage medium having thereon computer-executable instructions implementing a method for logging a user on to an operating system of a computing device, the method comprising:

authenticating the user based on information obtained therefrom and a user account corresponding thereto as maintained by the operating system;

creating a first session for the user;

collecting during user logon, based at least partially on the user account for the user, security information necessary to create a full privileges token that represents a full security context available for the user on the operating system in connection with the first session;

generating, during the user logon, the full privileges token based on the security information to encapsulate and specify privileges represented by such security information such that the full privileges token includes a full set of privileges of the user on the operating system of the computing device;

creating a first base process for the first session and attaching the full privileges token to such first base process such that the first base process operates only in accordance with the privileges of the user as set forth in the attached full privileges token;

reviewing the full privileges token to determine that such full privileges token includes privileges beyond a predetermined minimum set of limited privileges;

creating a second session for the user during said user logon;

generating, during the user logon, another full privileges token to include said full set of privileges of the user on the operating system of the computing device;

modifying the another full privileges token by removing all privileges except the minimum set of limited privileges to convert such another full privileges token into a limited privileges token that represents a limited security context available for the user on the operating system in connection with the second session, the limited privileges token thus including a limited set of privileges of the user on the operating system of the computing device as compared with the full set of privileges of the full privileges token; and associating the full privileges token with the limited privileges token during the user logon process creating a second base process for the second session and attaching the limited privileges token to such second base process such that the second base process operates only in accordance with the privileges of the user as set forth in the attached limited privileges token.

15. The computer-readable storage medium of claim 14 wherein said step of collecting the security information includes collecting identifications of the user and groups to which the user belongs, identifications of security types to be associated with the user, and identifications of privileges to be applied to the user.

16. The computer-readable storage medium of claim 14 wherein said step of generating the full privileges token includes submitting the collected security information to a kernel of the operating system, the kernel reviewing such submitted security information and in fact generating the full privileges token based thereon to encapsulate and specify the privileges represented by the submitted security information, the kernel storing the generated full privileges token in a memory reserved for the kernel and returning a reference to such full privileges token as residing in the memory.

17. The computer-readable storage medium of claim 14 wherein said step of reviewing the full privileges token includes comparing the privileges of the full privileges token with a list of conditions defining the minimum set of limited privileges.

18. The computer-readable storage medium of claim 17 wherein the method comprises modifying the another full privileges token by filtering said another full privileges token according to the list of conditions to remove all privileges except the minimum set of limited privileges as set forth in the list of conditions.

19. The computer-readable storage medium of claim 14 wherein said step of generating the another full privileges token comprises one of generating the another full privileges token in a manner akin to generating the full privileges token of the first session; and duplicating the full privileges token of the first session.

20. The computer-readable storage medium of claim 14 wherein associating the limited privileges token with the full privileges token is employed in the event a process in the second session is to initiate generation of a process in the first session.

* * * * *

UNITED STATES PATENT AND TRADEMARK OFFICE
CERTIFICATE OF CORRECTION

| | | |
|---|---|---|
| PATENT NO. | : 7,636,851 B2 | Page 1 of 1 |
| APPLICATION NO. | : 11/171744 | |
| DATED | : December 22, 2009 | |
| INVENTOR(S) | : Jeffrey B. Hamblin et al. | |

It is certified that error appears in the above-identified patent and that said Letters Patent is hereby corrected as shown below:

In column 14, line 10, delete "(26, 27)" and insert -- (26, 27), --, therefor.

In column 17, line 20, in Claim 12, after "duplicating the full" insert -- privileges --.

Signed and Sealed this

Eighth Day of February, 2011

David J. Kappos
*Director of the United States Patent and Trademark Office*